(12) United States Patent
Hebert et al.

(10) Patent No.: US 11,498,435 B2
(45) Date of Patent: Nov. 15, 2022

(54) SYSTEMS AND METHODS FOR AN ELECTRIFIED HEAVY-DUTY VEHICLE

(71) Applicant: LES MOTEURS NORDRESA INC., Laval (CA)

(72) Inventors: Yan Hebert, Granby (CA); Marc Daigneault, Ile-Bizard (CA); Sylvain Castonguay, Laval (CA); Francois Dube, Montreal (CA); Guillaume Desourdy, Terrebonne (CA); Philippe Louisseize, Saint-Joseph-du-Lac (CA); Louis-Andre Calve, Terrebonne (CA); Jason Soares, Montreal (CA); Marc-Antoine Beaudoin, Montreal (CA)

(73) Assignee: Dana Heavy Vehicle Systems Group, LLC, Maumee, OH (US)

( * ) Notice: Subject to any disclaimer, the term of this patent is extended or adjusted under 35 U.S.C. 154(b) by 0 days.

(21) Appl. No.: 16/944,024

(22) Filed: Jul. 30, 2020

(65) Prior Publication Data
US 2022/0032787 A1 Feb. 3, 2022

(51) Int. Cl.
*B60R 16/04* (2006.01)
*B60L 50/60* (2019.01)
*B60L 50/64* (2019.01)
*B60L 53/80* (2019.01)
*B60K 1/04* (2019.01)

(52) U.S. Cl.
CPC ............ *B60L 50/66* (2019.02); *B60L 50/64* (2019.02); *B60L 53/80* (2019.02); *B60K 2001/0438* (2013.01)

(58) Field of Classification Search
CPC .......... B60L 50/66; B60L 50/64; B60L 50/50; B60L 50/00; B60L 53/80; B60L 2200/36; B60L 2200/40; B60K 2001/0438; B60K 2001/0455; B60K 2001/0472; B60K 2001/001; B60K 1/00; B60K 1/04
See application file for complete search history.

(56) References Cited

U.S. PATENT DOCUMENTS 2,789,234 A 4/1957 Lambert et al.
4,555,096 A 11/1985 Pryor
(Continued)

FOREIGN PATENT DOCUMENTS

DE 202014101670 U1 7/2014

OTHER PUBLICATIONS

"Car Suspensions," ESF Stream Engineering Lab Website, Available Online at https://esfstream.com/update-atrc-truck/car-suspensions/, Available as Early as Jan. 2019, 2 pages.

*Primary Examiner* — James M Dolak
(74) *Attorney, Agent, or Firm* — McCoy Russell LLP

(57) ABSTRACT

Methods and systems are provided for an electric heavy-duty vehicle. In one example, the vehicle includes a battery pack for supplying current to an electric motor of the vehicle, the battery pack arranged in a chassis of the vehicle and configured to form part of a floor of the vehicle. The vehicle also includes a motor coupled to front wheels of the vehicle, the front wheels having hub assemblies housing drive shaft adapters configured to permanently couple the hub assemblies to drive shafts of the front wheels, and a cradle configured to be mounted with electrical sub-systems of the vehicle.

9 Claims, 13 Drawing Sheets

(56) References Cited

U.S. PATENT DOCUMENTS

| | | | |
|---|---|---|---|
| 6,059,058 A * | 5/2000 | Dower | B60L 50/52 |
| | | | 180/65.265 |
| 6,612,394 B2 | 9/2003 | Wessman | |
| 6,932,148 B1 | 8/2005 | Brummett et al. | |
| 7,291,932 B2 * | 11/2007 | Wurtele | H02P 9/04 |
| | | | 290/40 C |
| 7,373,315 B2 * | 5/2008 | Chernoff | B60G 17/0195 |
| | | | 705/26.1 |
| 8,910,735 B2 * | 12/2014 | Kawasaki | B60K 7/0007 |
| | | | 301/6.5 |
| 9,102,331 B2 * | 8/2015 | Bluethmann | B62D 7/026 |
| 9,156,341 B2 * | 10/2015 | Matsumura | B60L 50/66 |
| 9,168,818 B2 * | 10/2015 | Hirai | B60T 7/02 |
| 9,527,368 B2 * | 12/2016 | Raymond | B60G 21/051 |
| 9,573,452 B2 * | 2/2017 | Agnew | B60K 1/00 |
| 9,649,923 B2 * | 5/2017 | Perlo | B60K 1/04 |
| 9,937,781 B1 | 4/2018 | Bryer et al. | |
| 10,358,023 B2 * | 7/2019 | Hegewald | B60L 58/26 |
| 10,688,854 B2 * | 6/2020 | Caliskan | B60K 1/04 |
| 11,155,148 B2 * | 10/2021 | Chung | B60K 1/00 |
| 11,177,525 B2 * | 11/2021 | Fan | H01M 10/613 |
| 11,214,136 B2 * | 1/2022 | Brock | B60K 5/12 |
| 11,220,169 B2 * | 1/2022 | Favaretto | B60L 50/66 |
| 11,228,189 B2 * | 1/2022 | Matsuyama | B60L 53/80 |
| 2004/0169374 A1 | 9/2004 | Wurtele et al. | |
| 2010/0025131 A1 * | 2/2010 | Gloceri | B60K 6/52 |
| | | | 180/65.265 |
| 2015/0191070 A1 | 7/2015 | Raymond | |
| 2017/0106904 A1 | 4/2017 | Hanson et al. | |
| 2019/0291556 A1 | 9/2019 | Caliskan et al. | |

* cited by examiner

SYSTEMS AND METHODS FOR AN ELECTRIFIED HEAVY-DUTY VEHICLE

FIELD

The present description relates generally to methods and systems for an electrified heavy-duty vehicle.

BACKGROUND AND SUMMARY

An internal combustion engine heavy-duty vehicle may be configured with rear-wheel drive to enhance initial acceleration and increase traction. Increasing interest in reducing fossil fuel combustion has led to efforts to provide electric heavy-duty vehicles. In order to electrically propel such vehicles, a large battery pack may be demanded. The battery pack may be positioned low in the vehicle, such as along a chassis of the vehicle, and may have a large footprint, resulting in packaging constraints along an underside of the vehicle. In some examples, modifications to vehicle configuration are demanded to accommodate incorporation of the battery pack. For example, in order to maintain traction and torque at the vehicle wheels and also adjust for the positioning of the battery pack, the vehicle may be adapted with front-wheel drive (e.g., as the battery pack may not leave space for a drive shaft extending a length of the chassis), where providing electrical regenerative capabilities at the vehicle front wheels may be desirable. Reconfiguration of various vehicle electrical sub-systems, such as a hydraulic pump, an air compressor, an air conditioning compressor, vehicle wiring harnesses, brake lines, etc. may also be demanded due to installation of the battery pack. In addition, integration of the large battery pack into the vehicle in a manner which allows the battery pack to be readily removed without compromising a structural integrity of the vehicle chassis may drive further modifications.

In one example, the issues described above may be addressed by an electric vehicle having a battery pack for supplying current to an electric motor of the vehicle, the battery pack arranged in a chassis of the vehicle and configured to form part of a floor of the vehicle, a motor arranged adjacent to the chassis and coupled to front wheels of the vehicle, the front wheels having hub assemblies housing drive shaft adapters, wherein the drive shaft adapters are configured to permanently couple the hub assemblies to drive shafts of the front wheels, and a cradle positioned adjacent to the chassis along a frame of the vehicle, the cradle configured to be mounted with electrical sub-systems of the vehicle. In this way, the electric vehicle may be adapted with front-wheel drive to accommodate incorporation of a large battery pack and enable efficient packaging of sub-system power electronics.

For example, the hub assemblies of the front wheels may be four-wheel drive hub assemblies modified to permanently couple to drive shafts of the front wheels by installing the drive shaft adapters in the hub assemblies. The drive shaft adapters may enable regenerative braking to be implemented at the front wheels, thereby increasing a power efficiency of the vehicle. In addition, an overall footprint of the electrical sub-systems may be reduced by consolidating the sub-systems onto the cradle. The cradle may be pre-assembled prior to installing in the vehicle, thus reducing assembly time and simplifying coupling of the sub-systems to the vehicle.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

FIGS. 1-14 are shown approximately to scale.

DETAILED DESCRIPTION

Figure 1:
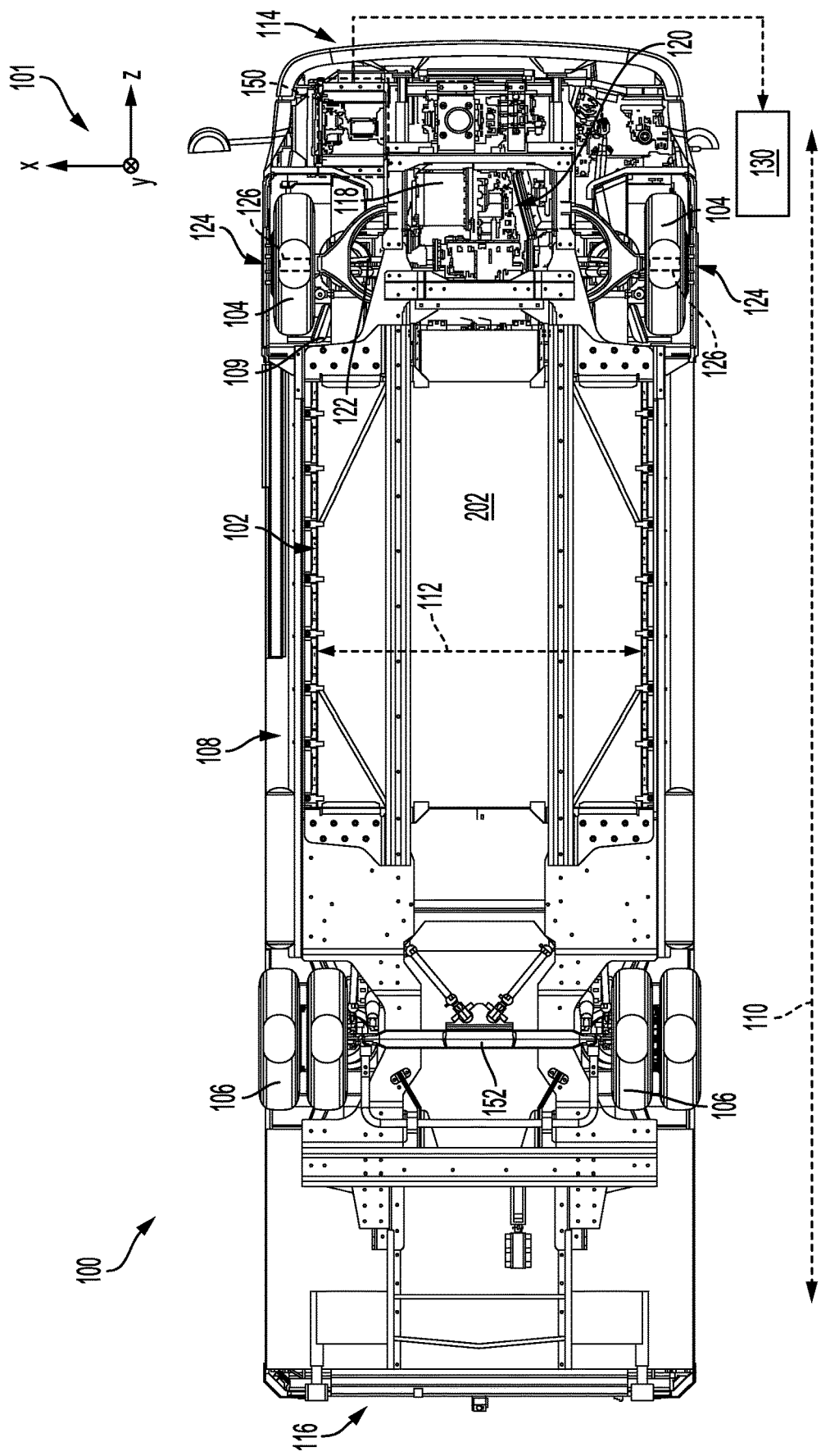
FIG. 1 shows an example of a vehicle incorporating a battery pack extending along a chassis of the vehicle from a bottom view.
Figure 2:
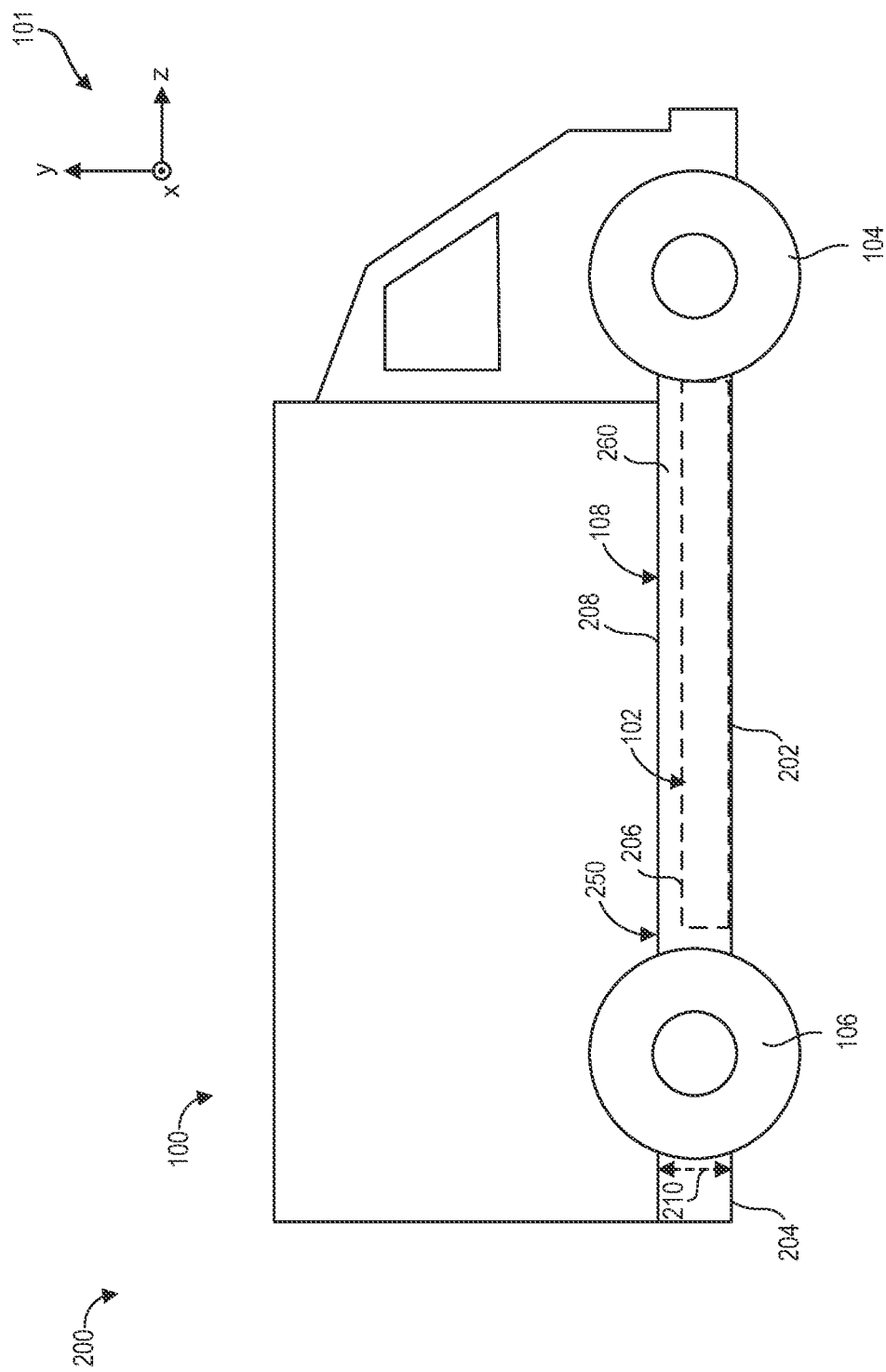
FIG. 2 shows the vehicle incorporating the battery pack from a profile view.
Figure 3:
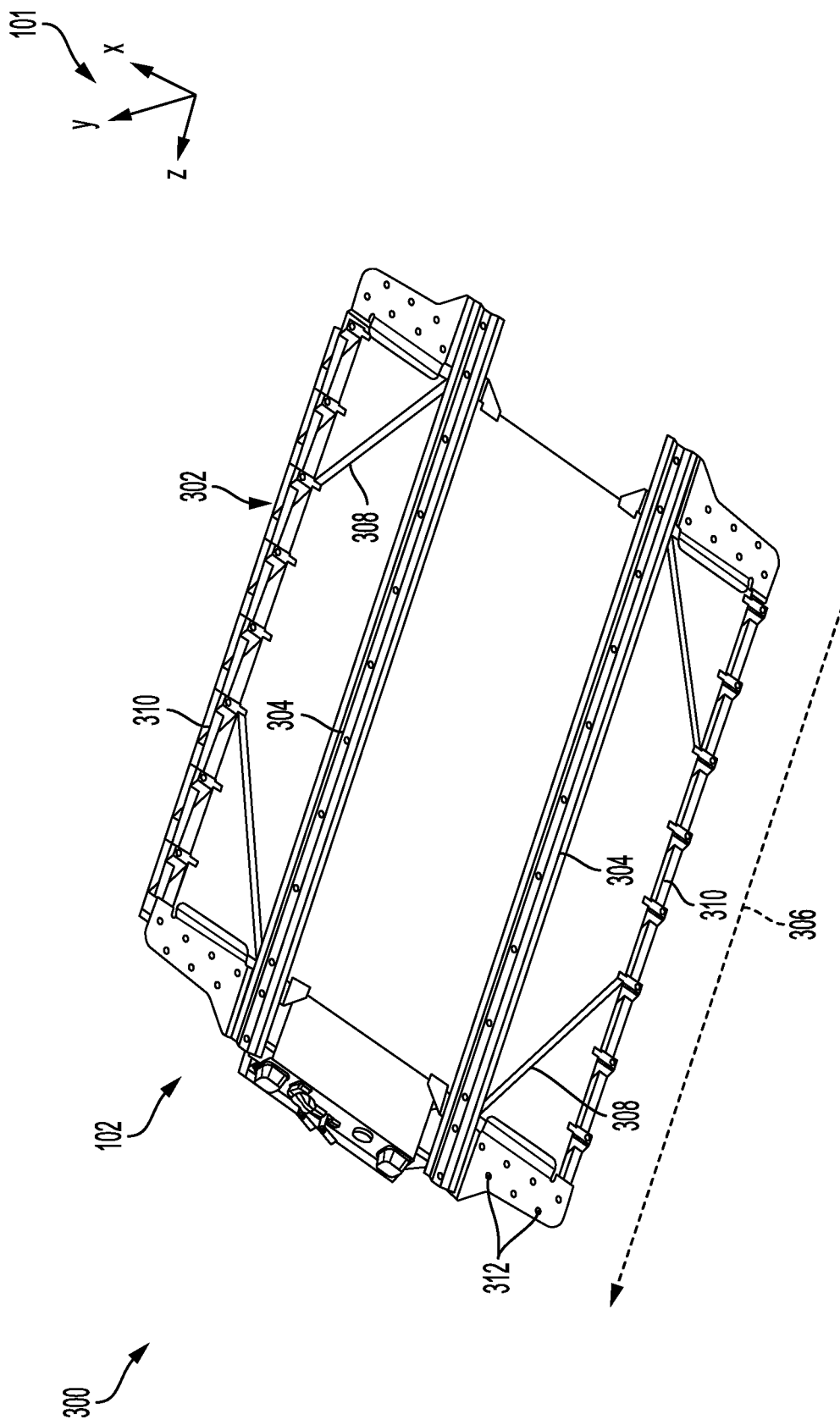
FIG. 3 shows perspective view of an example of a battery pack which may be included in a heavy-duty vehicle.
Figure 4:
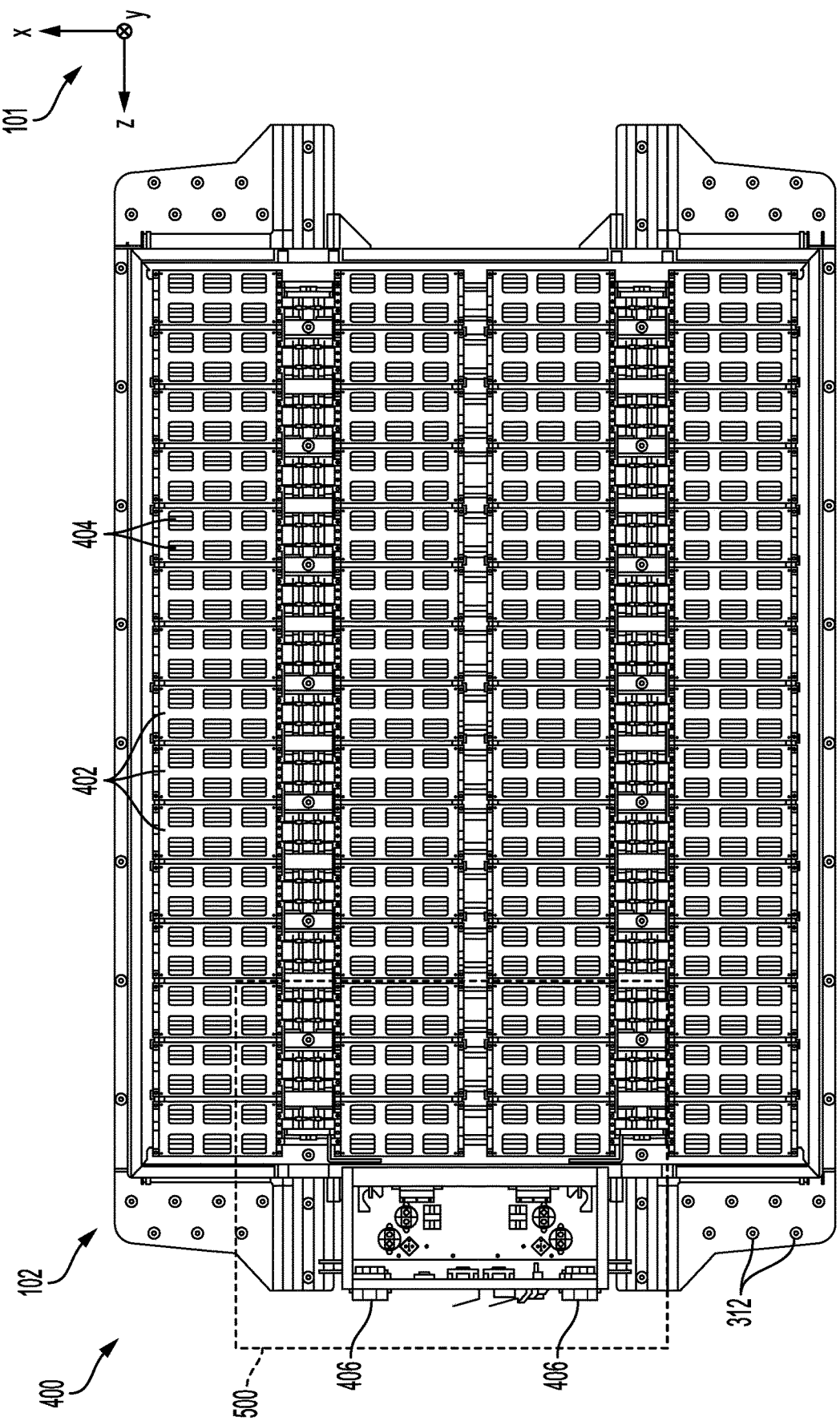
FIG. 4 shows the battery pack of FIG. 3 with an outer cover removed.
Figure 5:
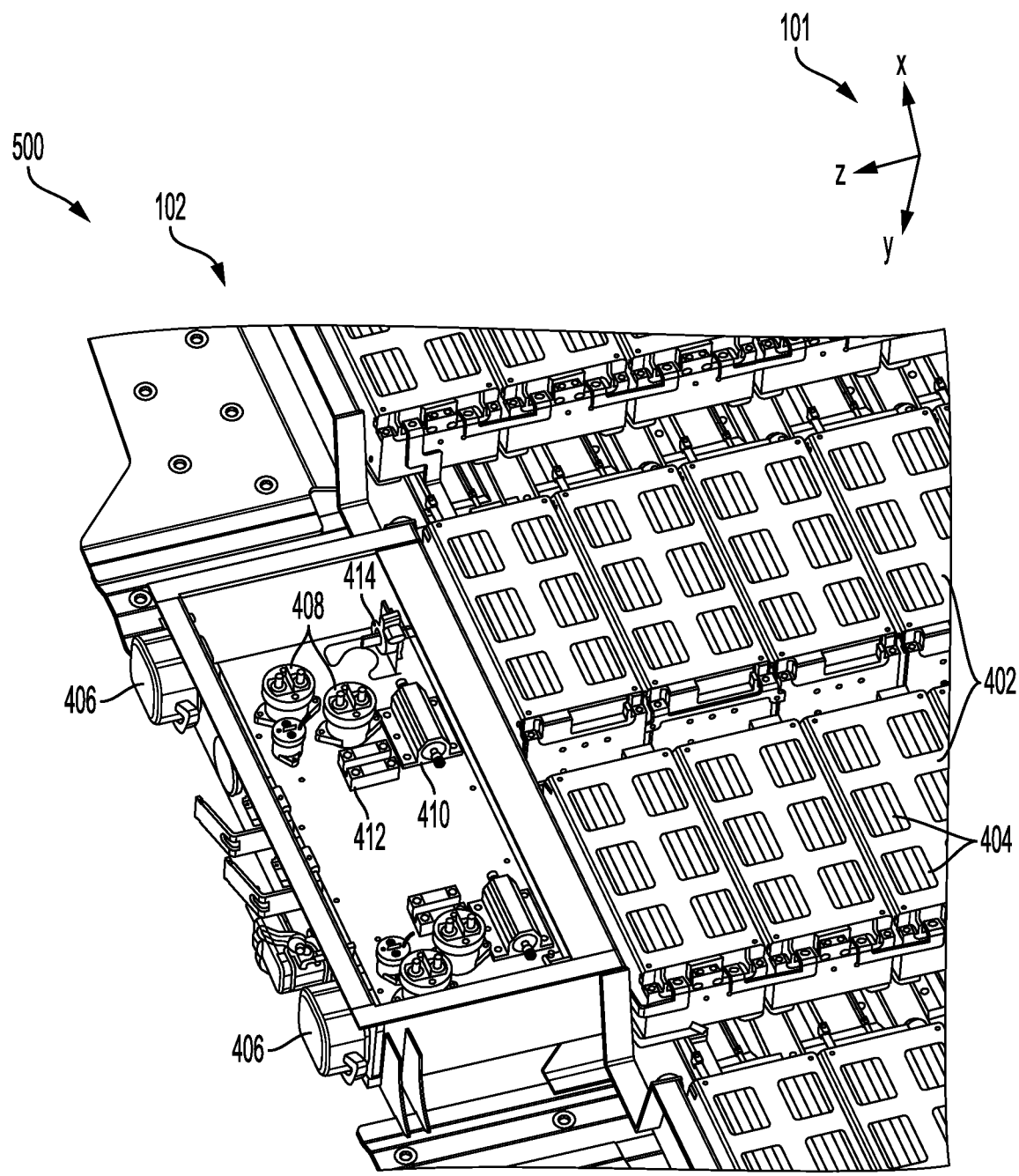
FIG. 5 shows a detailed view of an internal components of the battery pack.
Figure 6:
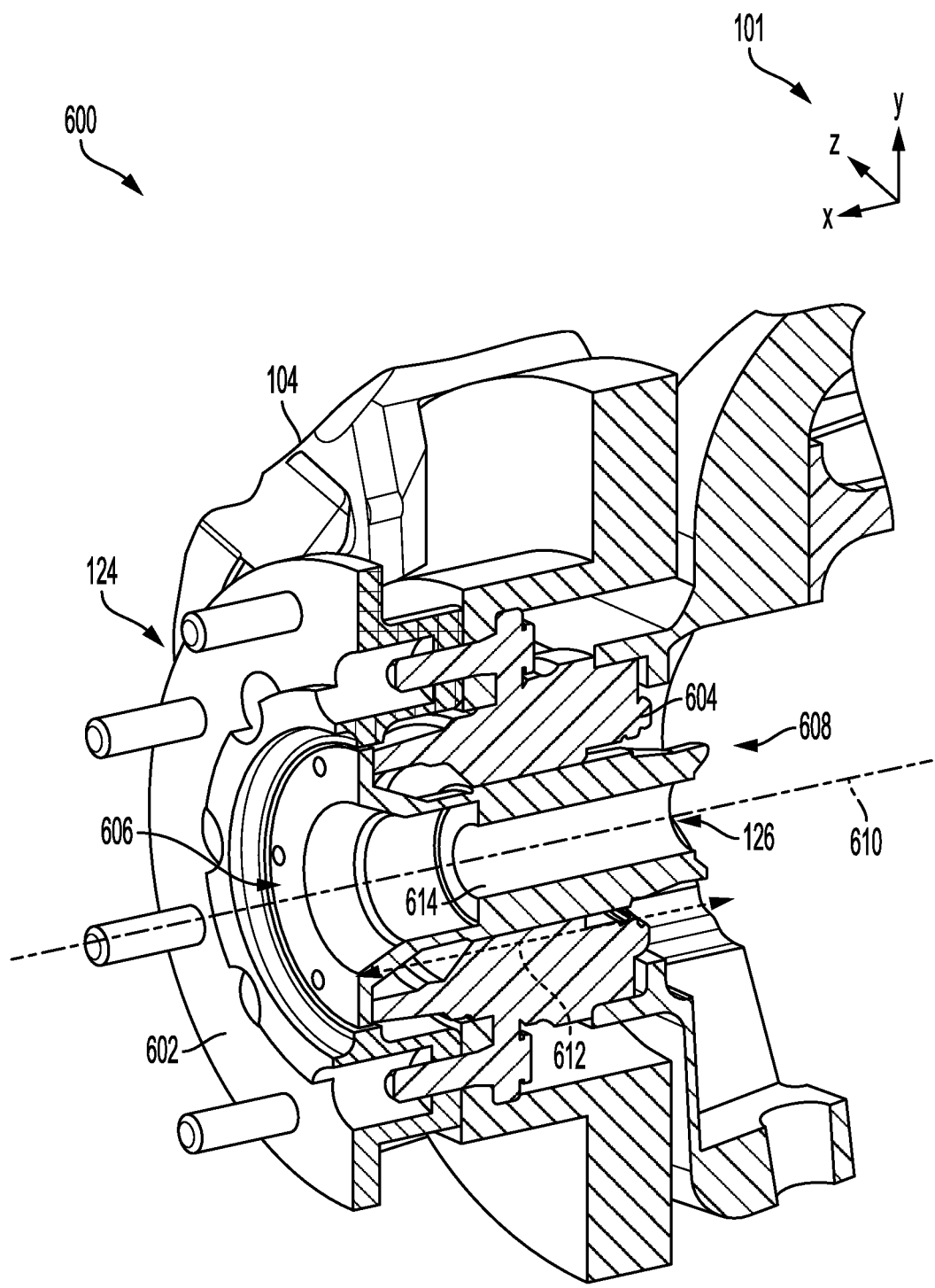
FIG. 6 shows a cutaway view of an example of a drive shaft with a drive shaft adapter, which may be implemented in the heavy-duty vehicle incorporating the battery pack.

The following description relates to systems and methods for an electrified heavy-duty vehicle. In order to be electrically propelled, an electrical system of the vehicle may be adapted with a battery pack arranged along a chassis of the vehicle, as shown in FIG. 1. In one example, the vehicle may be configured with a skateboard chassis where the battery is integrated into the skateboard chassis, as illustrated in FIG. 2. An example of the battery pack is shown in FIG. 3 from a perspective view and depicted in FIG. 4 with an outer housing removed. A more detailed view of an internal structure of the battery pack is shown in FIG. 5. The electrified vehicle may be adapted with front-wheel drive to accommodate a positioning of the battery pack in the vehicle while providing a desired traction and acceleration at the vehicle wheels. The vehicle may further be configured with regenerative braking to recharge the battery pack. As such, the front wheels may include drive shaft adapters which allow regenerative braking to be conducted at the front wheels. An example of a drive shaft adapter arranged in a wheel hub is illustrated in FIG. 6, in a cut-away view. The drive shaft adapter is shown in greater detail in FIGS. 7-9. To further accommodate placement of the battery pack in the vehicle, the vehicle may include a sub-system cradle, as shown in the examples of FIGS. 10-12B, the sub-system cradle configured to consolidate mounting of electrical sub-systems of the vehicle onto a single structure, thereby simplifying assembly and decreasing an overall footprint of the sub-systems. An exemplary configuration of the sub-system cradle within the vehicle is further depicted in FIGS. 13 and 14.

FIGS. 1-14 show example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space therebetween and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Further, elements shown intersecting one another may be referred to as intersecting elements or intersecting one another, in at least one example. Further still, an element shown within another element or shown outside of another element may be referred as such, in one example.

Turning now to FIG. 1, a heavy-duty vehicle 100 may have an electrical system configured with a battery pack 102 as a prime mover providing electrical energy for propulsion. A set of reference axes 101 are provided for comparison between views shown, indicating a y-axis, an x-axis, and a z-axis. In one example, the y-axis may be parallel with a direction of gravity and a vertical direction, the x-axis parallel with a horizontal direction, and the z-axis parallel with transverse direction and a longitudinal axis of the vehicle 100, e.g., parallel with a length of the vehicle 100. The heavy-duty vehicle 100 may be a variety of vehicle types, including light commercial vehicles, buses of different sizes, medium- and heavy-duty trucks, vocational vehicles, etc. The battery pack 102 may be an energy storage device configured to deliver electrical power to various components of the electrical system of the vehicle 100 including supplying current to motors coupled to front wheels 104 and/or rear wheels 106 of the vehicle 100. The battery pack 102 may extend along a chassis 108 of the vehicle 100, between the front wheels 104 and the rear wheels 106, along a portion of a length 110 of the vehicle 100. A width 112 of the battery pack 102 may be similar to a distance between innermost wheels of the rear wheels 106.

In one example, the chassis 108 of the vehicle 100 may be a skateboard chassis 108 in which the battery pack 102 is integrated, e.g., forming a continuous unit with the skateboard chassis 108. The skateboard chassis 108 may extend along a greater portion of the length 110 of the vehicle 100 than the battery pack 102, from a point behind the front wheels 104 to a rear end 116 of the vehicle. However, in other examples, the skateboard chassis 108 may vary in length, e.g., the skateboard chassis 108 may be shorter than depicted in FIG. 1. In one example, as shown in a profile view 200 of the vehicle 100 in FIG. 2, the skateboard chassis 108 may be a platform forming a floor 250 (e.g., having an upper surface 208) of the vehicle 100. The skateboard chassis 108 may be formed of a solid, durable, strong material, such as aluminum, steel, fiber-reinforced materials, and/or other composite materials, able to withstand and support large loads (e.g., a maximum load for which the vehicle 100 is designed to carry under predetermined use cases or conditions).

The battery pack 102 may be embedded in the skateboard chassis 108, e.g., enclosed in a recess in the skateboard chassis 108, to form a single integrated structure, and may therefore also be incorporated into the floor 250 of the vehicle 100. A bottom face 202 of the battery pack 102 may form a portion of a bottom surface 204 of the skateboard chassis 108. The battery pack 102 may therefore be biased within the skateboard chassis 108 at a lower region, with respect to the y-axis, of the skateboard chassis 108. However, in other examples, the battery pack 102 may instead be biased at an upper region of the skateboard chassis 108 with an upper face 206 of the battery pack 102 forming a portion of an upper surface 208 of the skateboard chassis 108. In yet other examples, the battery pack 102 may extend along a majority of a height 210 of the skateboard chassis 108, or of the height 210 of rails of the frame 260 of the vehicle 100.

The skateboard chassis 108 may provide various benefits with respect to efficient assembly and packaging of the vehicle 100. For example, the skateboard chassis 108 may be readily scalable, allowing different types of vehicle bodies to be attached. Depending on a height of a payload of the vehicle 100, a low vertical (e.g., with respect to the y-axis) positioning of the battery pack 102 in the vehicle 100 may provide even and balanced weight distribution without adversely affecting, or even positively contributing to, a balance of the vehicle 100. Furthermore, locating the battery pack 102 in the vehicle floor may increase cabin space while enclosing the battery pack 102 in a durable, rigid structure that supports and shields the battery pack 102 from contact with debris, moving vehicle components, etc.

Returning to FIG. 1, a positioning of the battery pack 102 in the vehicle 100 may result in locating electrical components, such as electric motors, in a region between a front end 114 of the vehicle 100 and a front edge 109 of the skateboard chassis 108. Thus, packaging space is available between the front wheels 104, allowing implementation of a powertrain and a drive train at the front wheels 104 but not at the rear wheels 106 when the vehicle 100 is adapted with the skateboard chassis 108.

In addition, the battery pack 102 itself may be a strong, rigid structure and incorporating the battery pack 102 into the skateboard chassis 108 may further increase an overall stiffness, torsional resistance, and bending resistance of the skateboard chassis 108. By positioning the battery pack 102 at the bottom region of the skateboard chassis 108, the battery pack may be easily accessible for maintenance and/or replacement. As such, the battery pack 102 may be removably coupled to the skateboard chassis 108 and configured as a frame integrated independent sub-structure in the skateboard chassis 108. In other words, the battery pack 102 has a stand-alone structure that is embedded into the skateboard chassis 108 but readily accessible and may be removed when desired.

A perspective view 300 of the battery pack 102 is depicted in FIG. 3. The battery pack has a top cover (not shown at FIG. 3) and a bottom cover 302, where the bottom cover 302 may form the bottom face 202 of the battery pack 102 and be included in the bottom surface 204 of the skateboard chassis 108, as shown in FIG. 2. Accordingly, the bottom cover 302 may be formed of a rigid, durable material, such as steel, aluminum, a composite, etc. The top cover may be disposed opposite to the bottom cover 302 along the y-axis. The top cover may be formed of a less rigid material than the bottom cover, such as molded plastic or another polymer, the top cover not being exposed to an exterior of the vehicle 100. In other examples, the top cover may be formed of a same material as the bottom cover 302.

Reinforcing rails 304 may extend along a length 306 of the battery pack 102 with braces 308 extending between each of the rails 304 and side edges 310 of the bottom cover 302, at an angle relative to the reinforcing rails 304. The bottom cover 302 may further include apertures 312 for receiving fasteners to secure the bottom cover 302 to the skateboard chassis, e.g., the skateboard chassis 108 of FIGS. 1 and 2. It will be appreciated that the bottom cover 302 illustrated in FIG. 3 is a non-limiting example. Other examples may include variations in mechanisms and structures for coupling the bottom cover 302 to the skateboard chassis, as well as modifications to a geometry and relative dimensions of the bottom cover 302, without departing from the scope of the present disclosure.

The bottom cover 302 may provide a barrier between an internal structure of the battery pack 102 and external objects. The internal structure of the battery pack 102 may include a plurality of modules 402, as shown in a bottom view 400 of the battery pack 102 with the top cover removed and in a detailed view in FIG. 5 of dashed area 500. The plurality of modules 402 may be arranged in rows along the z-axis, spaced apart from adjacent rows. Each module of the plurality of modules 402 includes multiple cells 404 connected in series or parallel within the module 402. The plurality of modules 402 may be connected in parallel and coupled to electrical terminals 406 of the battery pack.

The battery pack 102 may include other internal components, such as electrical interconnects, at least one contactor 408, at least one pre-charge resistor 410, solid-state relays (SSRs) 412, and at least one current sensor 414, in addition to at least one temperature sensor, at least one voltage sensor, at least one current sensor, a battery management system, contactors, pre-charge resistors, high- and low-voltage fuses, a resistive heating system, busbars, a cooling system, a connector and a 12V bus for supplying power to the various electronics, etc. The battery pack 102 may be configured with a slave-master battery management system with a manual service disconnect (MSD) (e.g., at the electrical terminals 406), integrated heat pads, and pre-charge capability. The cells 404 may have various capacities and chemistries, and may be configured in any one of a number of series-parallel module configurations.

As described above, by adapting the vehicle with the skateboard chassis and integrated battery pack, additional components of the vehicle's electrical system, such as electric motors, may be positioned around the skateboard chassis, along a similar horizontal plane as the skateboard chassis. For example, an electric motor and a drive train may be arranged in front of the skateboard chassis, e.g., between the front end 114 of the vehicle 100 and a front edge 109 of the skateboard chassis 108 of FIG. 1, and between the front wheels 104. As such, the vehicle may be configured with front-wheel drive, as shown in FIG. 1. The vehicle 100 includes a motor 118 arranged proximate to the front end 114 of the vehicle 100, between the front wheels 104, the motor 118 configured to receive electrical power from the battery pack 102. In one example, the motor 118 may be a motor/generator, able to convert mechanical energy to electrical energy to recharge the battery pack 102. The motor 118 may be coupled to a drive train 120 which, in turn, is coupled to drive shafts 122 of the front wheels 104. The drive train 120 may include components such as a transmission and a differential. A torque converter may be located between the motor 118 and the transmission if the transmission is automatic, or a clutch may be arranged between the motor 118 and the transmission if the transmission is manual or single-gear direct drive. Thus, electrical power drawn from the battery pack 102 by the motor 118 may be converted to torque to drive rotation of the front wheels 104 via the drive train 120. The rear wheels 106 may be trailer wheels rotated together on a single axle 152.

Implementing regenerative braking in the vehicle 100 may increase an efficiency and appeal of the vehicle 100 by allowing energy that may otherwise be lost as waste heat to be at least partially recuperated. The recovered energy may be used to replenish battery charge with the motor 118 operating as a generator in such instances. However, conventional front wheel hub assemblies 124 compatible with motorized front wheels 104, such as front wheel hub assemblies used in heavy-duty vehicles configured with four-wheel drive, may not be suitable for regenerative braking due to an automatic locking mechanism of the conventional front wheel hub assemblies. The use of front wheel hub assemblies with automatic locking mechanisms may disrupt regenerative braking. For example, the automatic locking mechanism of a given front wheel hub assembly may correspond to a ratchet mechanism. Specifically, the automatic locking mechanism may allow a corresponding front wheel 104 to rotate freely about its drive shaft 122 when no torque is applied, impeding regenerative braking by allowing free rotation of the front wheel 104 absent applied acceleration torque (which in turn may not brake the vehicle 100). Instead, regenerative braking is typically made possible via a rigid connection between the drive shafts and the wheels, such that when deceleration (braking) torque is applied, the wheels will not rotate freely and kinetic energy of the vehicle 100 may be converted back to electrical energy. As an alternative, customized front wheel hub assemblies adapted for regenerative braking may be manufactured. However, such customized front wheel hub assemblies may be undesirable due to a high cost of production.

One approach to address the issue described above includes replacing the automatic locking mechanism of the conventional front wheel hub assemblies 124 with a drive shaft adapter 126, as indicated in FIG. 1, that enables regenerative braking to occur at the vehicle front wheels 104. As such, the conventional front wheel hub assemblies may be used, e.g., as used for four-wheel drive applications, circumventing additional costs arising from development of customized components, and adapted to assist in converting kinetic energy of the vehicle into energy stored at the battery pack 102. The drive shaft adapter 126 may be directly coupled to each of the front wheel hub assemblies 124, in contact with the drive shafts 122 of the front wheels 104. An example of one of the drive shaft adapters 126 is illustrated in FIG. 6, enclosed within one of the front wheel hub assemblies 124, from a cut-away view 600.

The front wheel hub assembly 124 may extend through a central region of one of the front wheels 104 such that at least a portion of the front wheel hub assembly 124 is circumferentially surrounded by the front wheel 104. The front wheel hub assembly 124 may be formed of a durable, rigid material, such as steel or aluminum and may include a wheel cover 602, a wheel bearing 604, amongst other components. The front wheel hub assembly 124 may have a central opening 606 in which the wheel bearing 604 is located. The wheel bearing 604 may similarly have a central opening 608 through which the drive shaft adapter 126 is inserted.

The drive shaft adapter 126 may be circumferentially surrounded by the wheel bearing 604 and in direct contact with the wheel bearing 604. The drive shaft adapter 126 may extend along the x-axis, centered about a central axis 610 of the front wheel hub assembly 124. A length 612, as defined along the x-axis, of the drive shaft adapter 126 may be similar to a width, also defined along the x-axis, of the front wheel hub assembly 124. The drive shaft adapter 126 may be a hollow, tubular structure with an inner passage 614 configured to receive a drive shaft, such as one of the drive shafts 122 of FIG. 1. The drive shaft adapter 126 may couple with the drive shaft and the wheel bearing 604 so that rotation of the drive shaft compels rotation of the drive shaft adapter and the wheel bearing 604 in unison with the drive shaft. The rotation of the wheel bearing 604 thereby drives rotation of remaining components of the front wheel hub assembly 124 and the front wheel 104, also in unison with the drive shaft.

Figure 7:
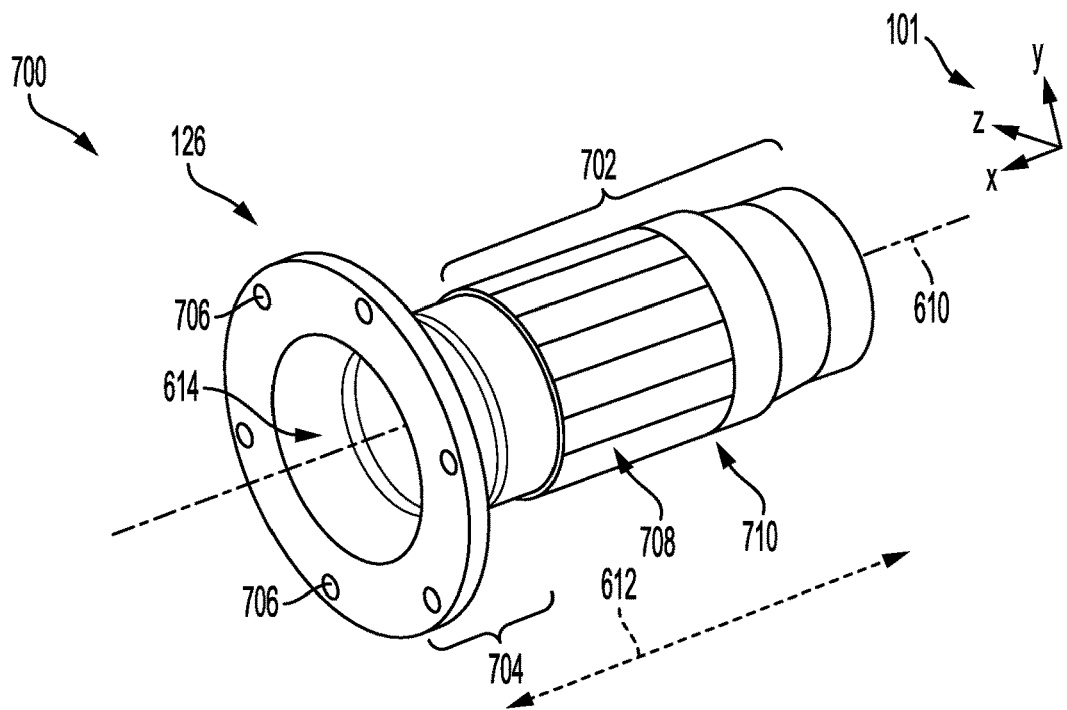
FIG. 7 shows a perspective view of the drive shaft adapter of FIG. 6.
Figure 8:
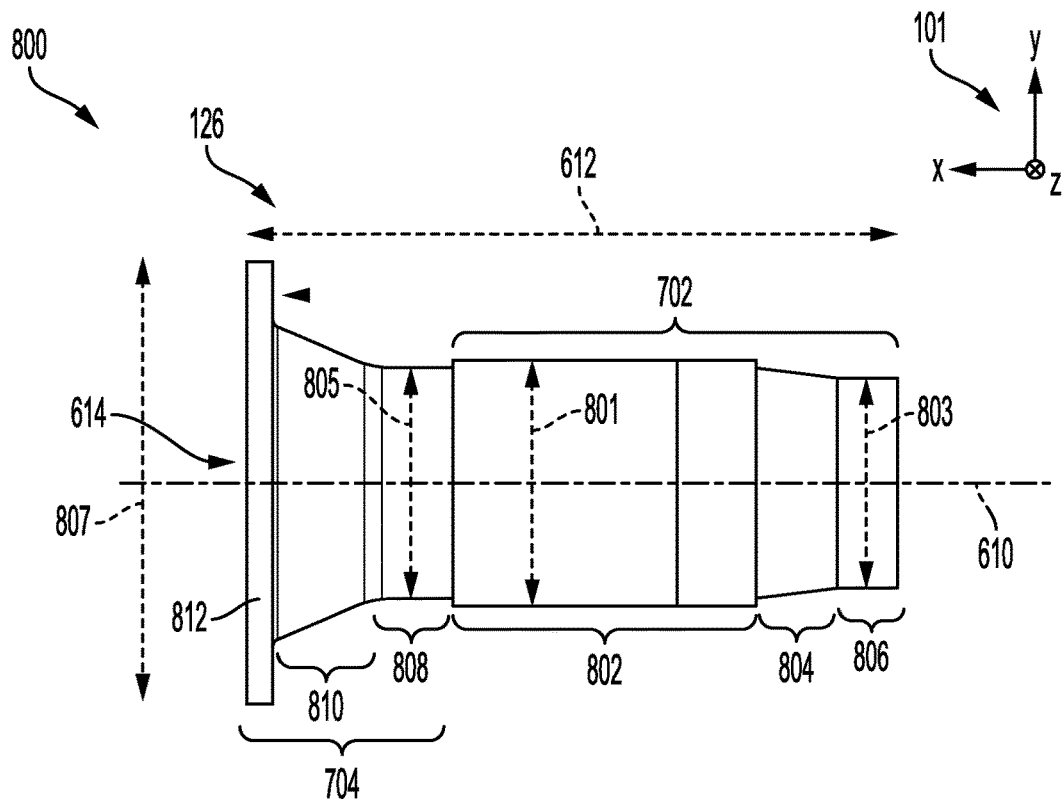
FIG. 8 shows a profile view of the drive shaft adapter of FIG. 6.
Figure 9:
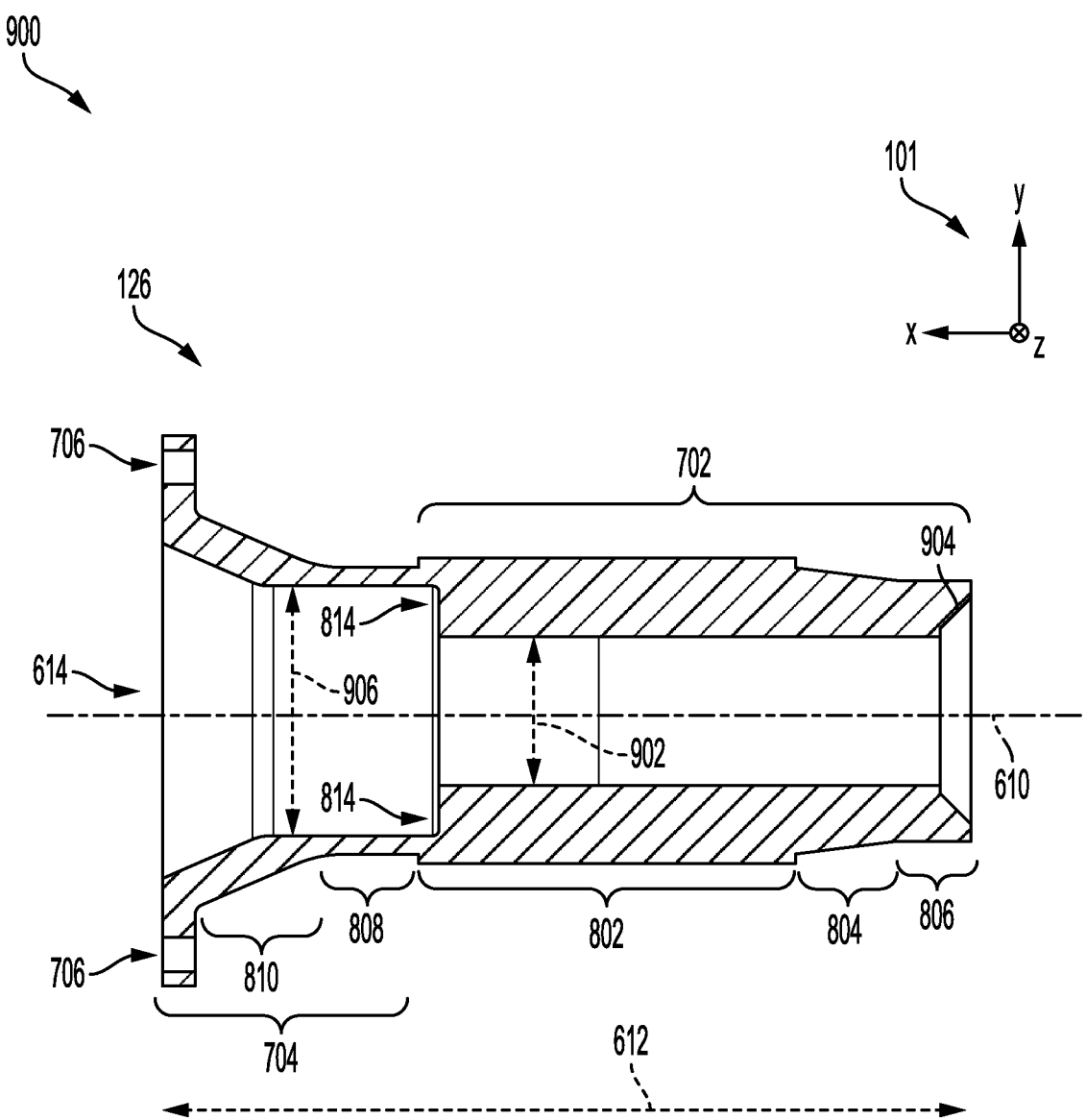
FIG. 9 shows a cross-section of the drive shaft adapter of FIG. 6.

The drive shaft adapter 126 is shown without the front wheel hub assembly 124 in FIGS. 7-9 from a perspective view 700, a profile view 800, and a cut-away view 900, respectively. The drive shaft adapter 126 may have a first portion 702 continuous with a second portion 704. The first portion 702 may form a greater portion of the length 612 of the drive shaft adapter 126 than the second portion 704. An outer diameter of the first portion 702 of the drive shaft adapter 126 may vary with a length of the first portion 702. For example, the first portion 702 may include a first section 802 adjacent to and contiguous with the second portion 704 of the drive shaft adapter 126, the first section 802 having a uniform outer diameter 801, as shown in FIG. 8. The first portion 702 may also have a second section 804 with a tapering outer diameter, e.g., the outer diameter of the second section 804 decreases from the first section 802 to a third section 806 of the first portion 702 of the drive shaft adapter 126. The first portion 702 may further include the third section 806 having a uniform outer diameter 803 that is narrower than the first section 802. While the outer diameter of the first portion 702 of the drive shaft adapter 126 is not uniform, an overall change in the outer diameter is less than an overall change in an outer diameter of the second portion 704 of the drive shaft adapter 126, as described further below.

An inner diameter 902, as shown in FIG. 9, of the first portion 702 (and of the inner passage 614 of the drive shaft adapter 126) may be uniform along most of the length of the first portion 702 except for a flared end 904 of the first portion 702, enclosed within the third section 806 of the first portion 702, where the inner diameter 902 increases. The inner diameter 902 of the first portion 702 may be similar to an outer diameter of a drive shaft, adapted to fit tightly around an end of the drive shaft so that the drive shaft and the drive shaft adapter 126 rotate in unison, e.g., the drive shaft does not rotate relative to the drive shaft adapter 126. The drive shaft adapter 126 may be coupled to the drive shaft via a press fit connection, by welding, via a fastening mechanism, and/or by a male-female mating configuration. In one example, the coupling of the drive shaft adapter 126 to the drive shaft may be permanent, e.g., the drive shaft adapter 126 and the end of the drive shaft may not be detached from one another once coupled.

For example, the drive shaft adapter 126 may include a plurality of male splines 708 on an outer surface 710 of the first portion 702. As shown, the plurality of male splines 708 may be substantially evenly spaced around a circumference of the first portion 702, and may extend along at least a portion of the outer surface 710 of the first portion 702 along the x-axis. A plurality of female splines (not shown at FIGS. 6-9) may be correspondingly disposed on an inner surface of the wheel bearing 604. The drive shaft adapter 126 may be press fit into the central opening 608 of the wheel bearing 604 such that the plurality of male splines 708 may respectively mate with the plurality of female splines. The inner passage 614 of the drive shaft adapter 126 may be loose fit to a spline of the drive shaft 122 (not shown at FIGS. 6-9) to form a constant-velocity (CV) joint. The drive shaft adapter 126 may be fixed to the drive shaft 122 via a nut (not shown at FIGS. 6-9) fastened on threads of an end of the drive shaft 122, the nut torqued to an inner surface 814 of the first section 802. A flange (e.g., third section 812, as described below) of the second portion 704 may be directly coupled and fastened to the wheel bearing 604 via a plurality of fasteners, such as bolts, respectively fit into a plurality of fastener holes 706. The second portion 704 of the drive shaft adapter 126 includes a first section 808 with a uniform outer diameter 805, as shown in FIG. 8, where the first section 808 is contiguous with the first section 802 of the first portion 702 of the drive shaft adapter 126. A second section 810 of the second portion 704, the second section 810 having a tapering outer diameter that increases from the first section 808 to the third section 812 of the second portion 704, is contiguous with the first section 808. The third section 812 of the second portion 704 of the drive shaft adapter 126 is contiguous with the second section 810 and may be a flange 812 with an outer diameter 807 forming a widest section, with respect to the y-axis, of the drive shaft adapter 126.

As illustrated in FIG. 9, an inner diameter 906 of the first section 808 and a part of the second section 810 of the second portion 704 of the drive shaft adapter 126 may be uniform along a length, as defined along the x-axis, of the second portion 704. Within the second section 810 and the flange 812 of the second portion 704, the inner diameter of the second portion increases along a direction from the second section 810 to the flange 812. The inner passage 614 of the drive shaft adapter 126 at the second portion 704 of the drive shaft adapter 126 may be configured to receive each of a CV joint nut and a hubcap. As shown in FIG. 6, the flange 812 of the drive shaft adapter 126 may be shaped to interface with both the wheel bearing 604 and the wheel cover 602 of the front wheel hub assembly 124. The flange 812 may include the plurality of fastener holes 706, as shown in FIGS. 7 and 9, to enable the drive shaft adapter 126 to be secured to the front wheel hub assembly 124 with fasteners, such as bolts. As such, the drive shaft adapter 126 may be connected to the wheel bearing 604 via a combination of the fasteners and a press-fit connection, resulting in the drive shaft, the drive shaft adapter 126, and the front wheel hub assembly 124 rotating in unison around the central axis 610 when compelled to turn by a motor. In other words, the drive shaft adapter 126 does not rotate relative to the drive shaft or the front wheel hub assembly 124.

Implementing front-wheel drive in the heavy-duty vehicle while maintaining use of the automatic locking hubs may impose undesirable power draw from a battery of the vehicle. Furthermore, the automatic locking hubs may not be compatible with regenerative braking, thus inhibiting recovery of energy generated during vehicle speed reduction. By replacing the automatic locking hubs with the drive shaft adapter shown in FIGS. 6-9, the front wheel hub assemblies may be fixedly coupled (e.g., the drive shaft adapter does not disengage from the front drive shaft) to the front drive shafts. Regenerative braking is thereby enabled at the vehicle front wheels. By replacing the automatic locking hubs with the drive shaft adapter without demanding further modifications to the front wheel hub assemblies (e.g., modifications to the wheel cover, the wheel bearing, and other components of the front wheel hub assemblies not directly interfacing with the drive shaft), increases in a cost of the front wheel hub assemblies may be circumvented while providing efficient energy recovery.

As described above, implementation of a drive shaft adapter may accommodate a front-wheel drive configuration of an electrified heavy-duty vehicle adapted with a skateboard chassis with an integrated battery pack. Packaging constraints imposed by the skateboard chassis may also demand rearrangement of power electronics of various vehicle electrical sub-systems such as a hydraulic pump, an air pump, an air conditioning (A/C) compressor, a water pump, controllers, junction boxes, fuses, a battery charger, inverters, etc., due to a vertically low positioning of the skateboard chassis. The sub-systems are included in an electrical system of the vehicle, drawing power from the battery pack. For example, as illustrated in FIG. 1, incorporation of the battery pack 102 into the skateboard chassis 108 may demand positioning sub-systems power electronics in a region between the front edge 109 of the skateboard chassis 108 and the front end 114 of the vehicle 100 where various other vehicle components already occupy at least a portion of the available packaging space. Positioning the power electronics of each of the sub-systems wherever each sub-system may be accommodated may result in use of long connectors, wires, and electrical cables which may be directly coupled to a frame of the vehicle 100 to maintain the connectors, wires, and cables off the ground. The connectors, wires, and cables may become easily tangled, degraded, and/or disconnected or come into contact with moving components of the vehicle 100. In addition, a scattered arrangement of the sub-systems may complicate access to components of the sub-systems when maintenance and repair is demanded.

Furthermore, during assembly, individual coupling of the sub-systems to the vehicle frame may be time consuming and include complex routing and tethering of connectors, wires, and cables. Sub-system components, such as pumps, may demand installation of rubber mounts to dampen transmission of vibrations to the vehicle chassis, which increases a number of parts to be attached to the vehicle and further adds to assembly time. In addition, individual coupling of the sub-systems may result in the sub-systems having an undesirably large footprint.

An overall footprint of the sub-systems power electronics may be reduced by mounting the power electronics on a single cradle. The cradle may be a supporting structure onto which the power electronics may be attached, thus consolidating the power electronics into a single unit. The power electronics may be assembled in the cradle prior to coupling to the vehicle. Electrical cables, vibrating components such as pumps, etc., may be secured to the cradle rather than individually attached to the vehicle frame and the cradle, supporting sub-systems relying on power from the battery pack, may be mounted to the vehicle frame in a position that allows convenient electrical coupling of the sub-systems to the battery pack. In some examples, the power electronics may be attached to the cradle without rubber supports. Instead, the cradle may be mounted to the vehicle chassis on rubber supports to reduce transmission of vibrations to the vehicle from the sub-systems power electronics as a single unit, thereby decreasing an amount of rubber supports for suppressing propagation of vibrations.

As described above, a cradle may provide consolidation of power electronics for various electrical sub-systems of a vehicle, thus decreasing an overall footprint of the sub-systems. The cradle may be positioned in an accessible location along the vehicle frame, around the skateboard chassis and proximate to the battery pack 102 to enable electrical coupling of the sub-systems to the battery pack 102 without use of undesirably long cables. For example, as shown in FIG. 1, a cradle 150 may be positioned along an underside of the vehicle 100, between the front end 114 and the skateboard chassis 108, along a driver's side of the vehicle 100. However, other examples may include the cradle 150 arranged in other locations along the vehicle frame, similarly between the front end 114 and the skateboard chassis 108 (such as on a passenger's side of the vehicle 100 or taking the place of an internal combustion engine, e.g., in front of the vehicle cabin). Accordingly, the cradle 150 may be placed for ease of access for maintenance thereof.

The power electronics mounted on the cradle 150 may include various sub-system controllers. The controllers may be communicatively coupled to a vehicle control unit 130, such as powertrain control module. The control unit 130 is a computing device, such as a microcomputer that includes a processor unit, a non-transitory computer-readable storage medium device, input/output ports, memory, and a data bus. Computer-readable storage medium included in the control unit 130 is programmable with computer readable data representing instructions executable by the processor for performing various control routines and methods. Operation of the various sub-systems supported on the cradle 150 may be controlled by the control unit 130, based on various sensors and actuators (not shown) included in the vehicle 100.

Figure 10:
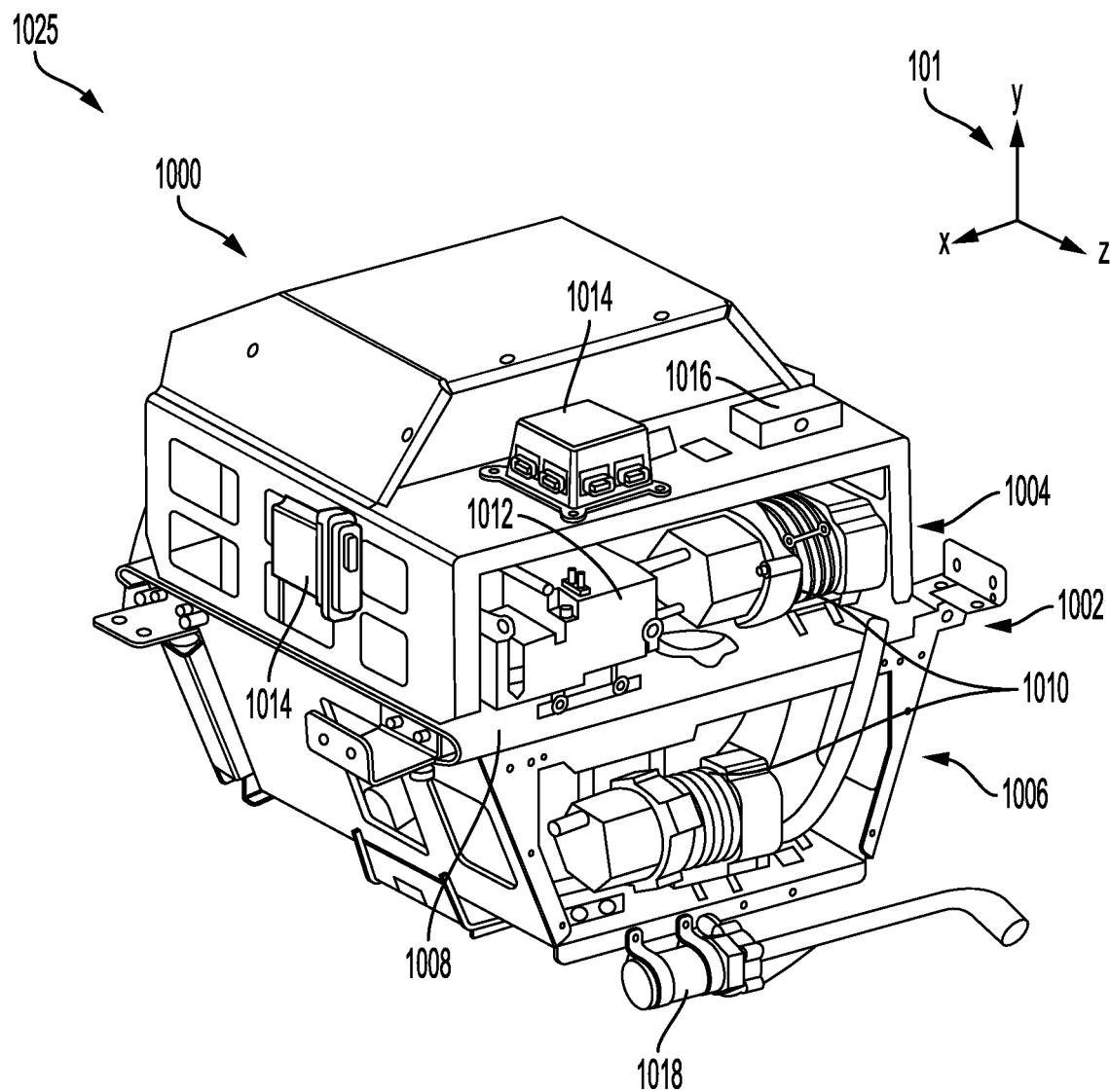
FIG. 10 shows a perspective view of a first example of a sub-system cradle which may be included in the heavy-duty vehicle incorporating the battery pack.
Figure 11B:
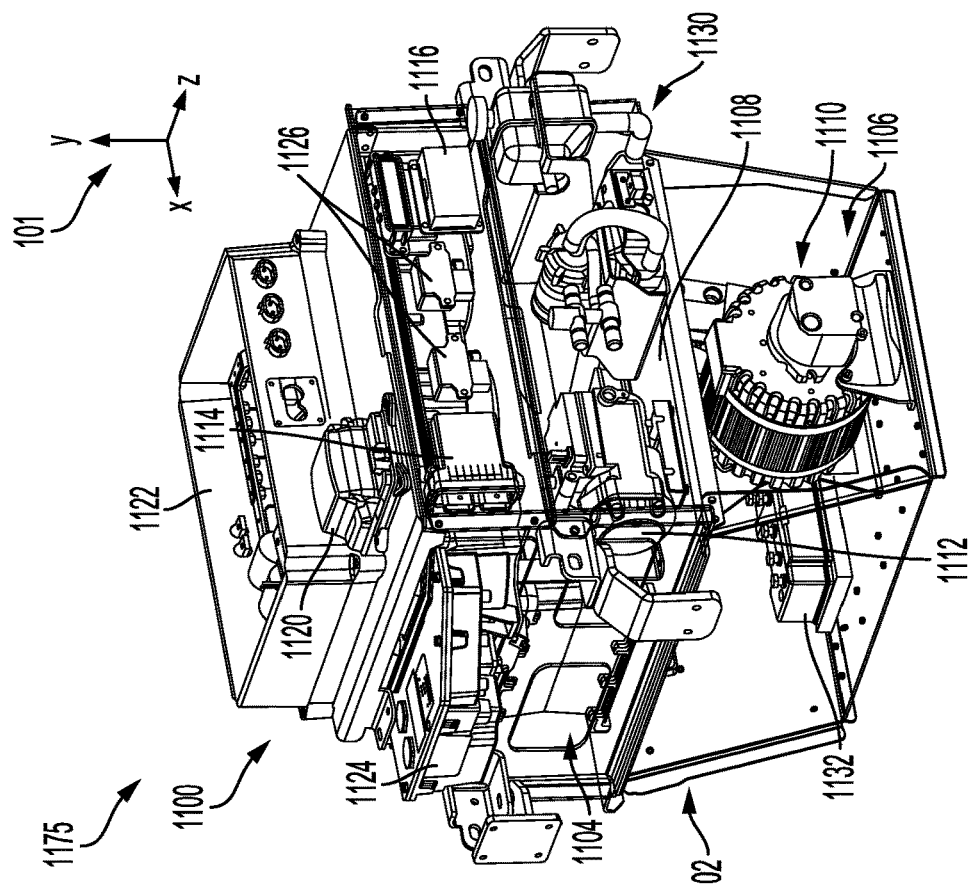
FIGS. 11A and 11B show perspective views of a second example of the sub-system cradle which may be included in the heavy-duty vehicle incorporating the battery pack.
Figure 11A:
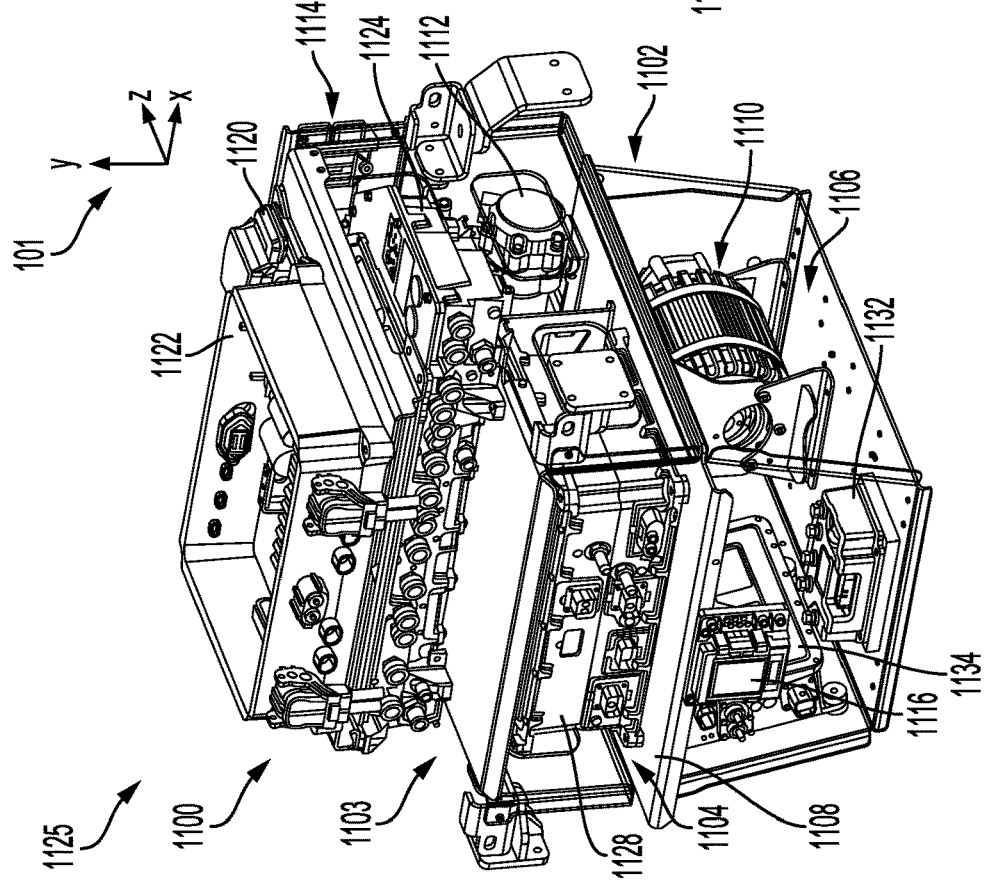
Figure 12B:
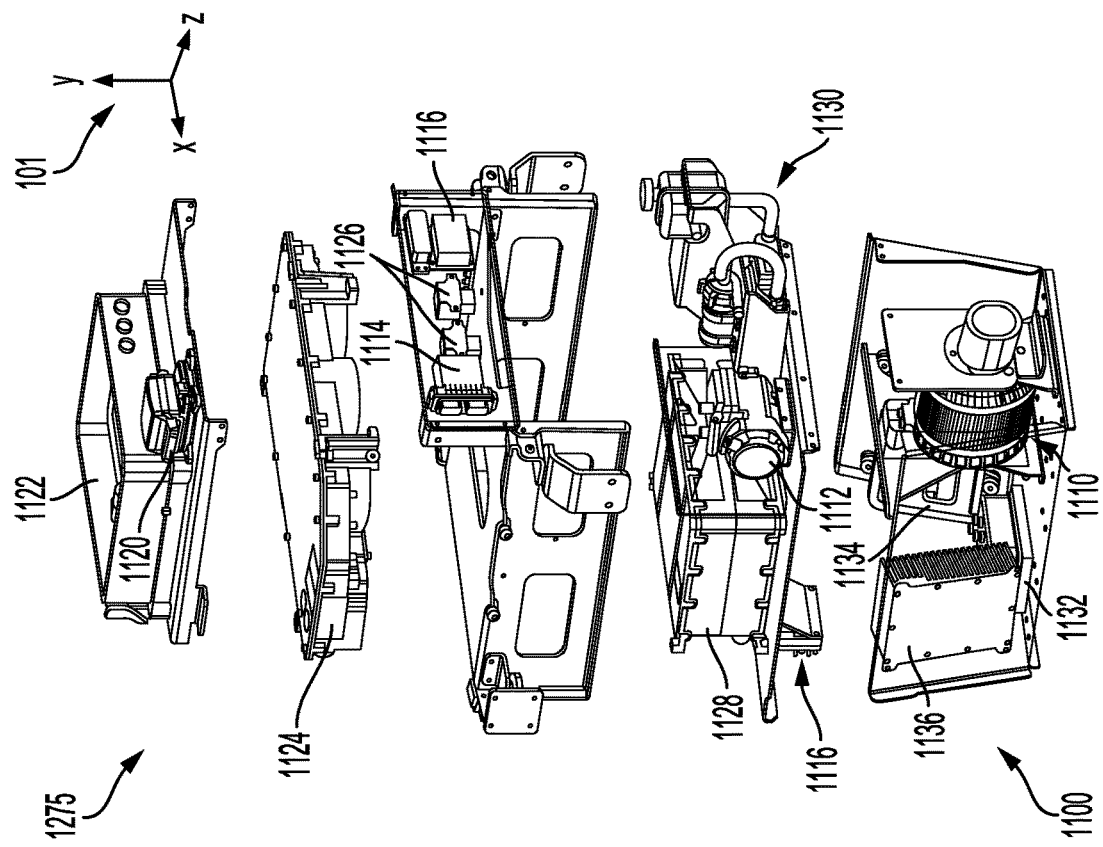
FIGS. 12A and 12B show exploded views of the sub-system cradle of FIGS. 11A and 11B.
Figure 12A:
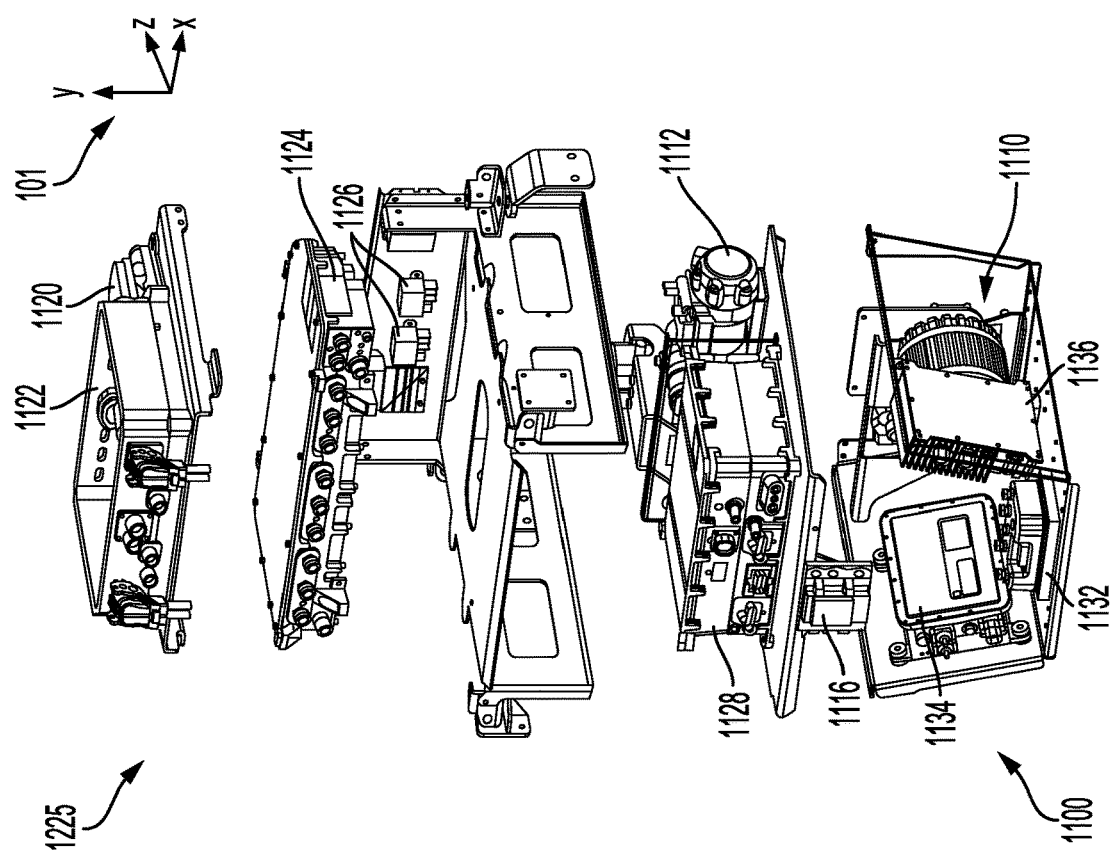

A first example of a cradle 1000 for supporting power electronics of vehicle sub-systems is shown in perspective view 1025 of FIG. 10. The cradle 1000 includes a frame 1002 formed of a rigid, durable material, such as aluminum, steel (e.g., A36 steel), casted metal, etc. The frame 1002 has a first compartment 1004 stacked over a second compartment 1006, along the y-axis, with a floor 1008 extending along the x-z plane therebetween and dividing the first compartment 1004 from the second compartment 1006. Various sub-system components may be directly attached to the frame 1002 of the cradle 1000 and/or within one or more of the first compartment 1004 and the second compartment 1006. For example, the sub-system components may be enclosed within each of the first compartment 1004 and the second compartment 1006 and also coupled to external surfaces of the frame 1002. The sub-system components may include one or more of electrohydraulic brake and electrohydraulic power steering pumps 1010, a heating, ventilation, and air-conditioning (HVAC) or air-conditioning (A/C) compressor 1012, one or more controllers 1014, one or more low-voltage fuse (e.g., 12V) boxes 1016, and one or more high-voltage coolant pumps 1018, in addition to other high-voltage power electronics including one or more of accessory inverters, high-voltage battery chargers, high-voltage motor inverters, high-voltage DCDC units, etc. It will be appreciated that at least some sub-system components, such as the low-voltage fuse boxes 1016, may be positioned for ease of access for maintenance.

Electrical cables, wires, as well as connectors such as pump hoses, tubing, etc., of the sub-system components may be directly coupled to the cradle 1000 before the cradle 1000 is attached to a vehicle. For example, the sub-system components may be mounted onto the cradle at a manufacturing facility. The assembled cradle 1000 may then be secured to a frame of the vehicle via fastening devices such as bolts or by other mechanical fastening methods. In some examples, the cradle 1000 may be removably coupled to the vehicle frame to allow detachment of the cradle 1000 when maintenance and/or inspection of the sub-system components is desired. Furthermore, rubber supports may be positioned between the cradle 1000 and the vehicle frame to absorb vibrations generated during operation of the sub-system components, such as the pumps 1010 and the compressor 1012.

A second example of a cradle 1100 for supporting power electronics of vehicle sub-systems is shown in perspective view 1125, perspective view 1175, exploded view 1225, and exploded view 1275 of FIGS. 11A-12B, respectively. It will be appreciated that features of the second example of FIGS. 11A-12B may be embodiments of similarly labeled features of the first example of FIG. 10. For example, the frame 1102 may be an embodiment of the frame 1002.

The cradle 1100 includes a frame 1102 formed of a rigid, durable material, such as aluminum, steel (e.g., A36 steel), casted metal, etc. Though the frame 1102 may be opaque in practice, the frame 1102 is depicted as transparent in FIGS. 11A-12B so as not to obscure the various components included therein. The frame 1102 has a first compartment 1104 stacked over a second compartment 1106, along the y-axis, with a floor 1108 extending along the x-z plane therebetween and dividing the first compartment 1104 from the second compartment 1106. A cavity 1103 may further be stacked over the first comportment 1104, along the y-axis. Various sub-system components may be directly attached to the frame 1102 of the cradle 1100 and/or within one or more of the cavity 1103, the first compartment 1104, and the second compartment 1106. For example, the sub-system components may be enclosed within each of the cavity 1103, the first compartment 1104, and the second compartment 1106 and also coupled to external surfaces of the frame 1102. The sub-system components may include one or more of electrohydraulic brake and electrohydraulic power steering pumps 1110 (a single electrohydraulic power steering pump 1110 coupled to an inverter 1132 therefor being depicted in the second example of FIGS. 11A-12B), an HVAC or A/C compressor 1112, one or more controllers 1114, one or more low-voltage (e.g., 12V) fuse boxes 1116, a multiplex power distribution module (MPDM) 1120, a junction box 1122, one or more low-voltage (e.g., 12V) contactors 1126, a cabin heater unit 1130, and an electric power takeoff (ePTO) system 1136 (not shown in FIGS. 11A and 11B so as not to obscure other components of the second compartment 1106) in addition to other high-voltage power electronics including one or more of accessory inverters (e.g., inverter 1130), high-voltage battery chargers 1128, high-voltage motor inverters 1124, high-voltage DCDC units 1134, high-voltage coolant pumps, etc. It will be appreciated that at least some sub-system components, such as the low-voltage fuse boxes 1116, may be positioned for ease of access for maintenance.

Electrical cables, wires, as well as connectors such as pump hoses, tubing, etc., of the sub-system components may be directly coupled to the cradle 1100 before the cradle 1100 is attached to a vehicle. For example, the sub-system components may be mounted onto the cradle at a manufacturing facility. The assembled cradle 1100 may then be secured to a frame of the vehicle via fastening devices such as bolts or by other mechanical fastening methods. In some examples, the cradle 1100 may be removably coupled to the vehicle frame to allow detachment of the cradle 1100 when maintenance and/or inspection of the sub-system components is desired. Furthermore, rubber supports may be positioned between the cradle 1100 and the vehicle frame to absorb vibrations generated during operation of the sub-system components, such as the pumps 1110 and the compressor 1112.

Figure 13:
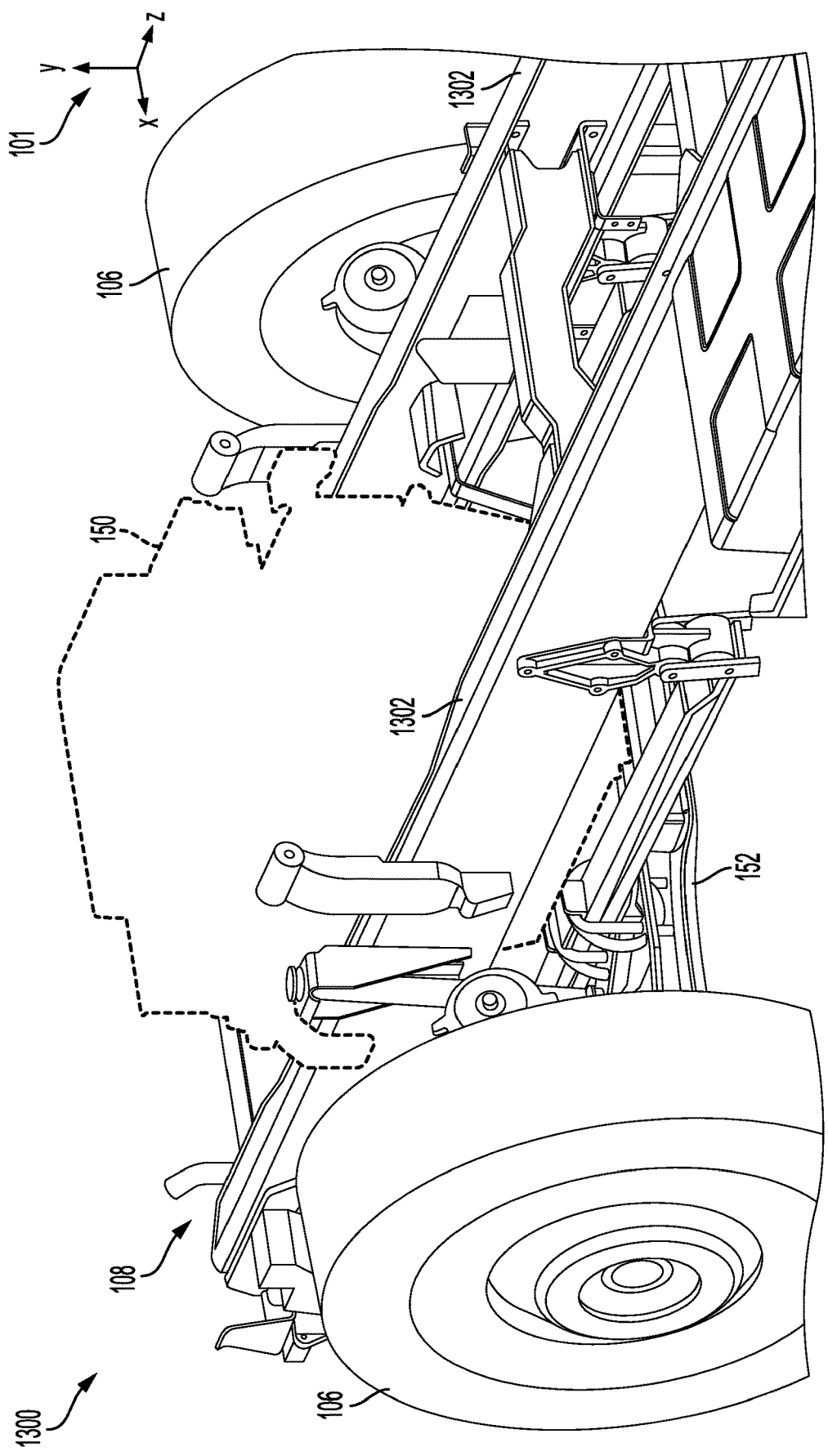
FIGS. 13 and 14 show an exemplary configuration of the sub-system cradle in the heavy-duty vehicle incorporating the battery pack.
Figure 14:
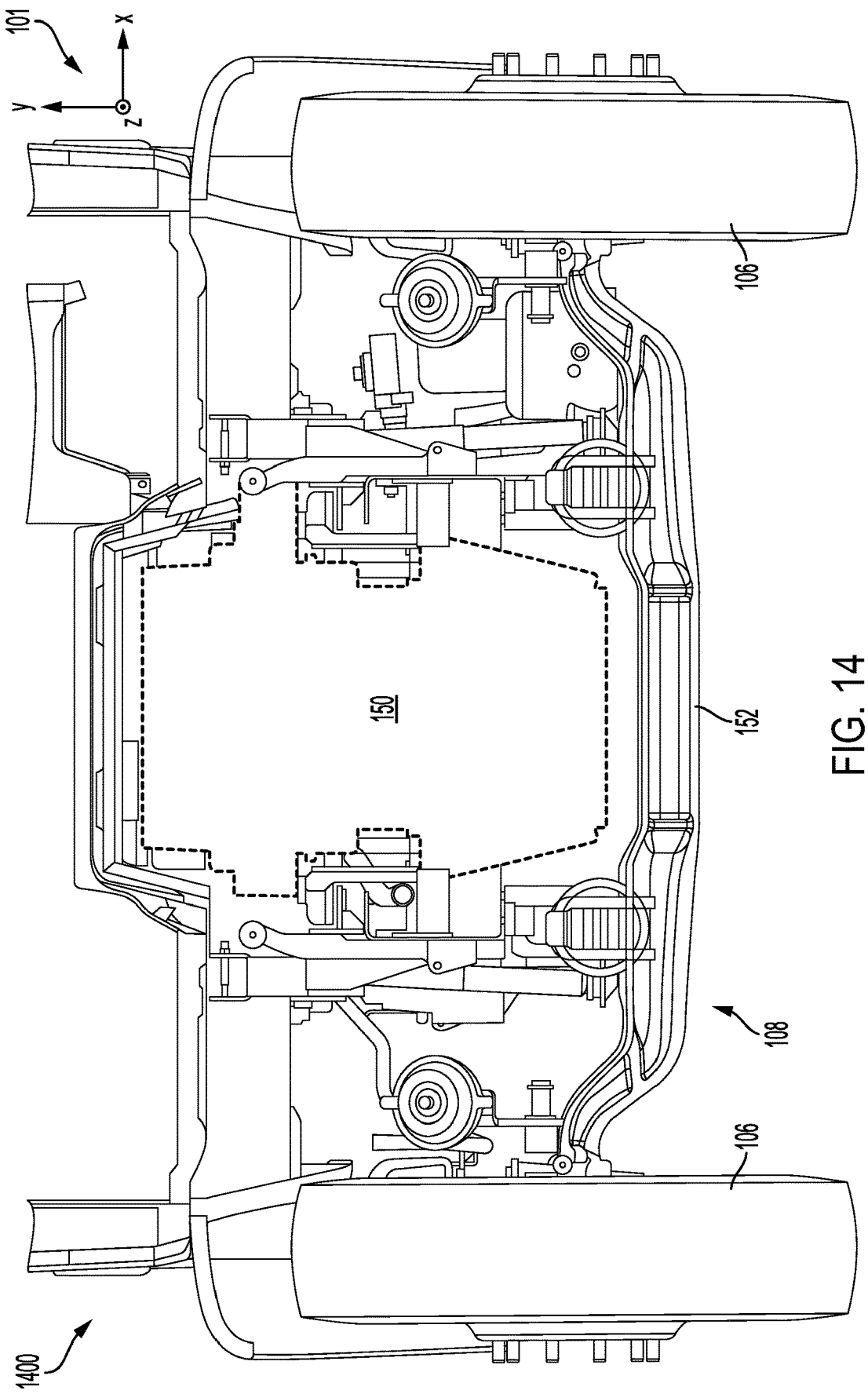

The cradle of the present disclosure may be positioned in various locations of the vehicle relative to the chassis having the battery pack. For example, the cradle may be positioned in front of the chassis at the driver's side, the passenger's side, or therebetween (e.g., taking the place of an internal combustion engine). In other examples, and as depicted in perspective view 1300 and cross section 1400 of FIGS. 13 and 14, respectively, the cradle, such as the cradle 150, may be positioned above an axle along the y-axis, such as the rear axle 152, between an innermost pair of wheels along the x-axis, such as between the innermost pair of the rear wheels 106. Specifically, the cradle 150 may account for the skateboard chassis 108 by being positioned adjacent to and at least partially within the skateboard chassis 108, e.g., above an upper surface (e.g., 208) of the skateboard chassis 108 along the y-axis, supported between and affixed to rails 1302 of the skateboard chassis 108 (as shown in FIGS. 13 and 14). It will be appreciated that each component of the vehicle is not depicted in FIGS. 13 and 14 so as not to obscure positioning of the cradle 150.

In this way, a heavy-duty vehicle may be electrified, powered by a battery pack integrated into a chassis of the vehicle where the chassis forms a floor of the vehicle. The integrated battery pack may be embedded into the chassis, reinforcing a structural integrity of the chassis, and configured to be removable to allow the battery pack to be readily inspected and/or removed. The vehicle may be adapted with front-wheel drive to accommodate a low vertical positioning of the chassis and battery pack. Front-wheel drive in the vehicle may be implemented at low cost by utilizing conventional wheel hub assemblies and coupling the wheel hub assemblies to front drive shafts of the vehicle via drive shaft adapters. The drive shaft adapters may replace automatic locking hubs, thereby permanently coupling to the front drive shafts and enabling regenerative braking to be implemented at the vehicle front wheels. Constraints on packaging space for power electronics of vehicle sub-systems imposed by the vehicle chassis and battery pack may be accommodated by mounting the power electronics onto a single cradle, thereby providing a compact arrangement of the sub-systems at a single location. Mounting the power electronics of the sub-systems onto the cradle may also allow the sub-systems to be located close to the battery pack from which the sub-systems may draw electrical power. The cradle may be pre-assembled, reducing an amount of time spent on coupling the sub-systems to the vehicle. Components and accessories of the power electronics, such as electrical cables, wires, etc., may be attached to the cradle instead of the vehicle frame, reducing a likelihood of entanglement and/or detachment. The cradle may be mounted to the vehicle frame with rubber supports to inhibit transmission of vibrations from the sub-systems to the vehicle frame, thereby suppressing transfer of vibrational energy at a single contact point, rather than at multiple connection points when the sub-systems are individually coupled to the vehicle frame. As a result, electrification of the heavy-duty vehicle is enabled at low cost and high efficiency with rapid assembly time.

The disclosure also provides support for an electric vehicle, comprising: a battery pack for supplying current to an electric motor of the electric vehicle, the battery pack arranged in a chassis of the electric vehicle and configured to form part of a floor of the electric vehicle, a motor arranged adjacent to the chassis and coupled to front wheels of the electric vehicle, the front wheels having hub assemblies housing drive shaft adapters, wherein the drive shaft adapters are configured to permanently couple the hub assemblies to drive shafts of the front wheels, and a cradle positioned adjacent to the chassis along a frame of the electric vehicle, the cradle configured to be mounted with electrical sub-systems of the electric vehicle. In a first example of the system, the battery pack is embedded in the chassis and a cover of the battery pack forms a portion of a surface of the chassis and wherein the chassis forms the floor of the electric vehicle. In a second example of the system, optionally including the first example, the battery pack is removably arranged in the chassis of the electric vehicle and the chassis is a skateboard chassis with a low vertical positioning in the electric vehicle. In a third example of the system, optionally including the first and second examples, the battery pack has a sub-structure independent of the chassis and includes at least one of a slave-master battery management system, connectors resistant to multiple spark discharge, pre-charge capability, and integrated heat pads. In a fourth example of the system, optionally including the first through third examples, the chassis extends from behind the front wheels to a rear end of the electric vehicle and wherein the battery pack is arranged in the chassis in a region between the front wheels and rear wheels of the electric vehicle. In a fifth example of the system, optionally including the first through fourth examples, the drive shaft adapters extend through a central opening of each of the hub assemblies and do not rotate relative to the hub assemblies. In a sixth example of the system, optionally including the first through fifth examples, the drive shaft adapters are configured to receive ends of the drive shafts in an inner passage of each of the drive shaft adapters. In a seventh example of the system, optionally including the first through sixth examples, the drive shaft adapters circumferentially surround the ends of the drive shafts and form a constant-velocity joint with the drive shafts. In an eighth example of the system, optionally including the first through seventh examples, the cradle is attached to the frame of the electric vehicle with a rubber support arranged in between, the rubber support configured to suppress transmission of vibrations. In a ninth example of the system, optionally including the first through eighth examples, the cradle has one or more compartments configured to house the electrical sub-systems and wherein the electrical sub-systems are directly coupled to a structure of the cradle and not the frame of the electric vehicle.

The disclosure also provides support for an electrical system of a heavy-duty vehicle, comprising: a battery pack embedded in a chassis of the vehicle, the chassis forming a floor of the vehicle, and a plurality of sub-system power electronics electrically coupled to the battery pack and mounted to a cradle. In a first example of the system, the cradle is positioned along a common horizontal plane as the chassis and arranged in a region along an underside of the vehicle between a front edge of the chassis and a front end of the vehicle. In a second example of the system, optionally including the first example, the cradle has a frame formed of a rigid, durable material and wherein the plurality of sub-system power electronics is directly attached to the frame of the cradle. In a third example of the system, optionally including the first and second examples, the frame of the cradle includes a first compartment stacked vertically over a second compartment and each of the first compartment and the second compartment are configured to enclose one or more of the plurality of sub-system power electronics. In a fourth example of the system, optionally including the first through third examples, one or more of the plurality of sub-system power electronics are coupled to external surfaces of the frame of the cradle. In a fifth example of the system, optionally including the first through fourth examples, the plurality of sub-system power electronics includes one or more of an inverter, a battery charger, a controller, a pump, an air conditioning compressor, a junction box, and a fuse.

The disclosure also provides support for an electric vehicle, comprising: a battery pack embedded in a chassis of the vehicle, the chassis forming a floor of the vehicle, and a motor arranged in front of the chassis and between front wheels of the vehicle, the motor driving rotation of the front wheels, wherein the front wheels have wheel hub assemblies housing drive shaft adapters configured to couple to drive shafts of the front wheels. In a first example of the system, the drive shaft adapters are arranged between ends of the drive shafts and the wheel hub assemblies, within central openings of the wheel hub assemblies, and wherein the wheel hub assemblies are four-wheel drive wheel hub assemblies. In a second example of the system, optionally including the first example, the drive shaft adapters have a first portion with a first inner diameter contiguous with a second portion with a second, larger inner diameter and wherein the first portion is configured to receive the ends of the drive shafts and the second portion is configured to interface with a wheel cover and a wheel bearing of the wheel hub assemblies. In a third example of the system, optionally including the first and second examples, the wheel hub assemblies with the drive shaft adapters are configured to be compatible with regenerative braking.

In another representation, an electric vehicle includes a battery pack embedded into a chassis of the vehicle, the battery pack forming a portion of a floor of the vehicle. In a first example of the electric vehicle, the battery pack is arranged in a recess of the chassis and forms a continuous unit with the chassis. A second example of the electric vehicle optionally includes the first example, and further includes, wherein the chassis forms the floor of the vehicle and extends from behind front wheels of the vehicle to a rear end of the vehicle and wherein a length and a width of the battery pack is less than a length and a width of the chassis. A third example of the electric vehicle optionally includes one or more of the first and second examples, and further includes, wherein the battery pack is biased towards a lower portion of the chassis and a removable cover of the battery forms a portion of a bottom surface of the chassis. A fourth example of the electric vehicle optionally includes one or more of the first through third examples, and further includes, wherein the removable cover includes reinforcing rails and braces extending between the rails and side edges of the removable cover. A fifth example of the electric vehicle optionally includes one or more of the first through fourth examples, and further includes, wherein the battery pack is configured to be removable from the chassis. A sixth example of the electric vehicle optionally includes one or more of the first through fifth examples, and further includes, wherein the removable cover has a plurality of apertures for receiving fasteners.

In another representation, an electric vehicle includes a drive shaft adapter positioned between a front drive shaft and a front wheel hub assembly of the vehicle, the drive shaft adapter configured to permanently couple to the front drive shaft. In a first example of the electric vehicle, the drive shaft adapter has a tubular structure with an inner passage aligned with a central axis of rotation of the front wheel hub assembly. A second example of the electric vehicle optionally includes the first example, and further includes, wherein the drive shaft adapter has a first portion contiguous with a second portion along a length of the drive shaft adapter and wherein the first portion has a smaller inner diameter than the second portion. A third example of the electric vehicle optionally includes one or more of the first and second examples, and further includes, wherein the inner diameter of the first portion of the drive shaft adapter is similar to an outer diameter of the front drive shaft and the first portion of the drive shaft adapter is configured circumferentially surround an end of the drive shaft adapter. A fourth example of the electric vehicle optionally includes one or more of the first through third examples, and further includes, wherein the second portion of the drive shaft adapter has a flange with fastener openings and wherein the flange is coupled to a wheel bearing of the front wheel hub assembly via a combination of a press-fit connection and fasteners inserted through the fastener openings. A fifth example of the electric vehicle optionally includes one or more of the first through fourth examples, and further includes, wherein the drive shaft adapter is in direct contact with the wheel bearing of the front wheel hub assembly and the drive shaft adapter does not rotate relative to the front wheel hub assembly. A sixth example of the electric vehicle optionally includes one or more of the first through fifth examples, and further includes, wherein the drive shaft adapter, the drive shaft, and the front wheel hub assembly rotate in unison.

In yet another representation, an electric vehicle includes a plurality of sub-system power electronics mounted to a cradle, where the cradle is coupled to a frame of the vehicle between a front end of the vehicle and a chassis of the vehicle. In a first example of the electric vehicle, the cradle has a frame formed of a rigid, durable material. A second example of the electric vehicle optionally includes the first example, and further includes, wherein the plurality of sub-system power electronics is attached to the frame of the cradle without rubber supports in between. A third example of the electric vehicle optionally includes one or more of the first and second examples, and further includes, wherein the plurality of sub-system power electronics are electrically coupled to a battery pack of the vehicle via electrical cables. A fourth example of the electric vehicle optionally includes one or more of the first through third examples, and further includes, wherein the electrical cables and other connectors of the plurality of sub-system power electronics are coupled to the frame of the cradle and not to the frame of the vehicle. A fifth example of the electric vehicle optionally includes one or more of the first through fourth examples, and further includes, wherein the plurality of sub-system power electronics includes controllers communicatively coupled to a control unit of the vehicle.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. An electric vehicle, comprising:
   a battery pack for supplying current to an electric motor of the electric vehicle, the battery pack arranged in a chassis of the electric vehicle and forming part of a floor of the electric vehicle;
   the electric motor arranged adjacent to the chassis and coupled to front wheels of the electric vehicle, the front wheels having hub assemblies housing drive shaft adapters, wherein the drive shaft adapters permanently couple the hub assemblies to drive shafts of the front wheels; and
   a cradle positioned adjacent to the chassis along a frame of the electric vehicle and having, in a stacked arrangement with one another, a cradle cavity, a first cradle compartment, and a second cradle compartment, the cradle having electrical sub-systems of the electric vehicle mounted thereon and therewithin so as to consolidate the mounting of the electrical sub-systems of the electric vehicle to the cradle.

2. The electric vehicle of claim 1, wherein the battery pack is embedded in the chassis and a cover of the battery pack forms a portion of a surface of the chassis and wherein the chassis forms the floor of the electric vehicle.

3. The electric vehicle of claim 1, wherein the battery pack is removably arranged in the chassis of the electric vehicle and the chassis is a skateboard chassis with a low vertical positioning in the electric vehicle.

4. The electric vehicle of claim 1, wherein the battery pack has a sub-structure independent of the chassis.

5. The electric vehicle of claim 1, wherein the chassis extends from behind the front wheels to a rear end of the electric vehicle and wherein the battery pack is arranged in the chassis in a region between the front wheels and rear wheels of the electric vehicle.

6. The electric vehicle of claim 1, wherein the drive shaft adapters extend through a central opening of each of the hub assemblies and do not rotate relative to the hub assemblies.

7. The electric vehicle of claim 1, wherein the drive shaft adapters are for receiving ends of the drive shafts in an inner passage of each of the drive shaft adapters.

8. The electric vehicle of claim 7, wherein the drive shaft adapters circumferentially surround the ends of the drive shafts and form a constant-velocity joint with the drive shafts.

9. The electric vehicle of claim 1, wherein the cradle is attached to the frame of the electric vehicle with a rubber support arranged in between, the rubber support for suppressing transmission of vibrations.

* * * * *